3,010,466
FLOW GAUGER
Charles H. Tillson, Houston, Tex.
(2001 E. Sudene, Fullerton, Calif.)
Filed Aug. 12, 1957, Ser. No. 677,483
4 Claims. (Cl. 137—87)

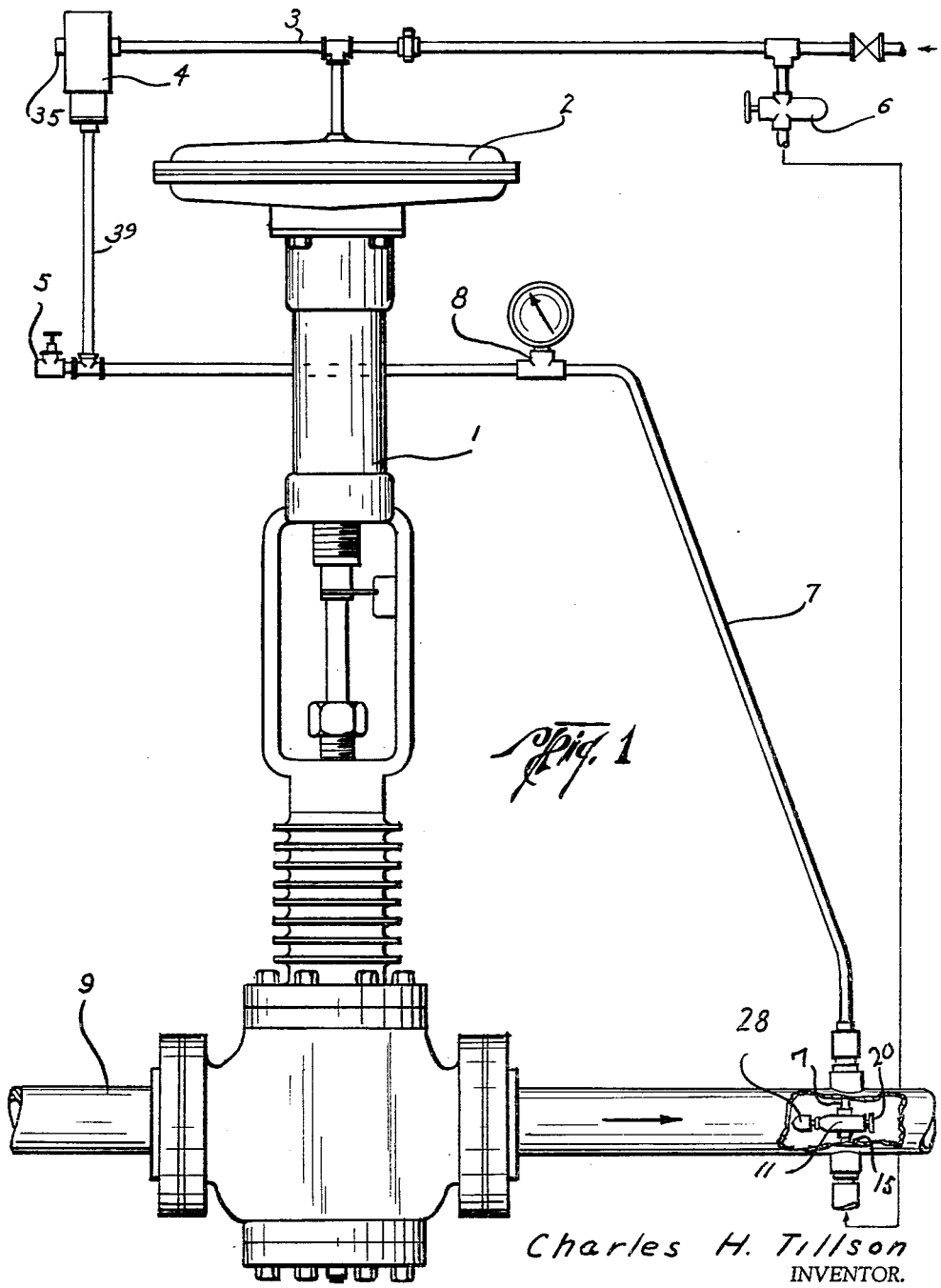

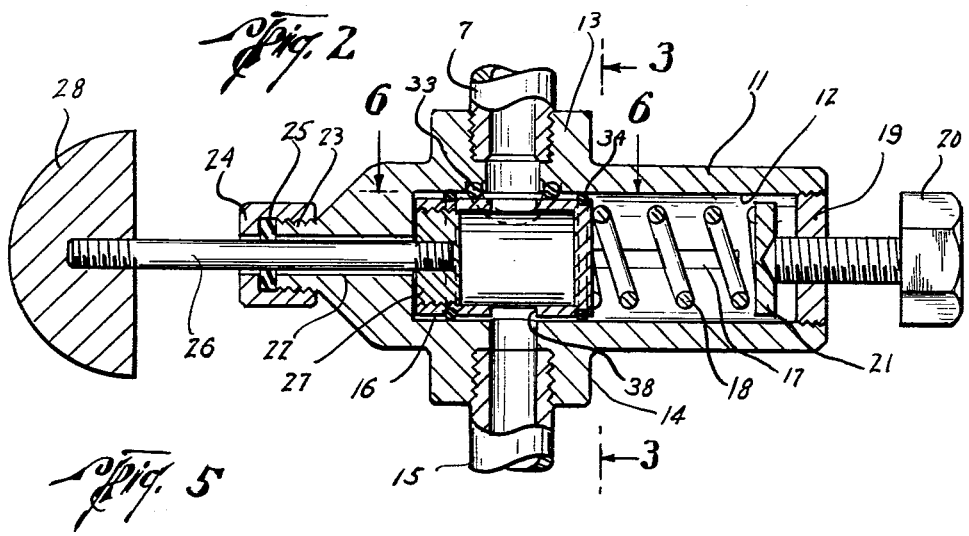
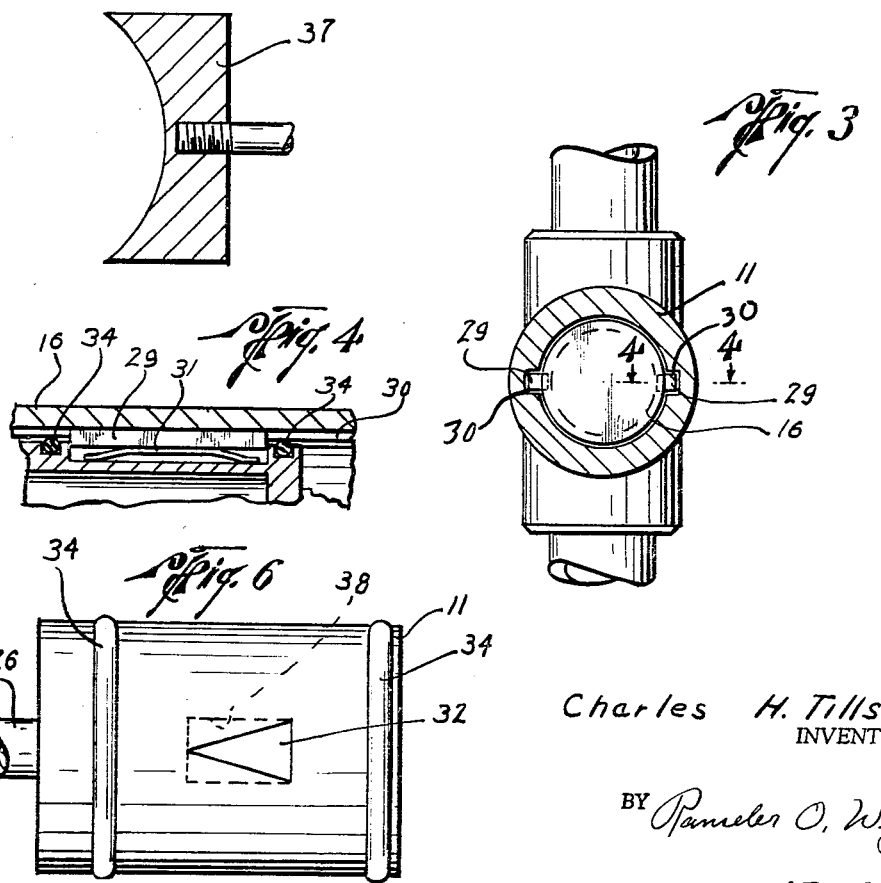

This invention relates to new and useful improvements in a flow gauger.

It is an object of this invention to provide a device for a modulating control of a diaphragm motor valve such as is in common use in conduits for the flow control of fluids.

It is another object of this invention to provide a device for mounting in a flow line downstream from a motor valve having means for utilizing the product of the media weight and velocity as a single variable to position a variable orifice for modulation of a media from an external source, such as an air supply, which actuates a pilot valve in the main air control supply line to the motor valve.

It is another object of the invention to provide a means for modulation of the flow of the air supply to a motor valve actuated by the variations in weight and velocity of the flow of fluid in the conduit in which the motor valve is mounted.

It is another object of the invention to provide a device for mounting in a flow line for modulation of the flow of the air supply to a motor valve actuated by the variations in weight and velocity of the flow of fluid in the conduit in which the motor valve is mounted.

It is another object of the invention to provide a flow gauger mounted in the path of flow in a conduit having novel means for varying the flow of fluid through the flow gauger as the weight and velocity of the flow in the flow line varies.

With the above and other objects in view, the invention has relation to certain novel features of construction, operation and arrangement of parts more particularly defined in the following specifications and illustrated in the accompanying drawings, wherein:

FIGURE 1 is a side elevational view of the motor valve, flow line and flow gauger, showing the flow line partially broken away to illustrate the flow gauger's position in the line.

FIGURE 2 is an enlarged side elevational view, in section, of the flow gauger.

FIGURE 3 is an end elevational view taken on the line 3—3 of FIGURE 2.

FIGURE 4 is an enlarged sectional view of the guide members employed in the flow gauger, taken on the line 4—4 of FIGURE 3.

FIGURE 5 is an enlarged fragmentary sectional view of another form of flow gauger head employed, and FIGURE 6 is an enlarged side elevational view of the restricted orifice in the air line of the flow gauger, taken on the line 6—6 of FIGURE 2.

Referring now more particularly to the drawings, the numeral 1 designates a motor valve of conventional design having a diaphragm motor 2 and conduit 3 for a supply of air under pressure controlling said motor. The air flow in the line 3 passes through a standard pressure controller 4 and through the bleed off orifice as 35. The pressure on the motor valve is usually about fifteen pounds, and a pressure regulator 6 is provided to furnish a supply of air pressure at a reduced pressure, preferably about three pounds, to the flow gauger from the supply line 3 through the conduit 7, which terminates in the bleed off valve 5. If desired, a gauge 8 may be mounted in the line 7 so that the pressure in the line 7 may be readily determined. When the valve 1 is set at the desired position, the pressure in the line 3, as controlled by the discharge through the controller 4 and through the pressure of the line 7 against the control mechanism of the controller 4, will maintain the motor of the motor valve at the desired position.

The motor valve 1 is mounted in a flow line 9 in the usual manner and a sufficient distance downstream of the valve 1 to avoid the turbulence created by the valve 1 is mounted the flow gauger having a barrel 11 which is provided with a piston chamber 12 and the air line connections 13, 14 having suitable means for receiving an air line, such as the sections 7, 15. A piston 16 is mounted in the chamber 12 and a guide shaft 17 extends outwardly axially from the piston 16, which said shaft also acts as a stop limiting the movement of the piston 16. A suitable tension means such as the coil spring 18 is mounted in the chamber 12 and abuts against the piston 16. The chamber 12 is closed at one end by means of the cap 19 which is provided with an axial internally threaded portion into which the externally threaded control bolt 20 is mounted. The end of the control bolt 20 seats in a depression in the spring follower 21, which bears against the end of the spring 18. An axial port 22 is formed in the other end of the barrel 11 and the outer surface of the barrel 11 tapers at said end to the projecting nipple 23, which is externally threaded and on which the internally threaded cap 24 having suitable packing means as 25 therein is mounted. The cap 24 has an axial port in alignment with the port 22 and a shaft 26 is mounted through said ports and one end is externally threaded and axially mounted in the externally threaded end plug 27. The piston 16 has internal threads at one end in which the plug 27 is mounted to anchor the shaft 26 to the piston 16. A head 28 is mounted on the extended end of the shaft 26, the head 28 being shaped as desired in accordance with the type of fluid in the conduit 9.

The piston 16 is provided with yieldable stabilizing means consisting of the keys 29, 29 which fit into suitable longitudinal slots 30, 30 in the inside wall of the chamber 12 and which are sealed off by means of the packing members 34, 34. Suitable tension means as the springs 31, 31 maintain a pressure against the keys 29, 29 which bear against the piston 16. The piston 16 is provided with an air passageway therethrough, preferably shaped as a wedge, as 32, and suitable sealing means as the annular groove and packing 33 may be mounted in the chamber 12 around the air passageway 13 and the piston 16 may be sealed against leakage of air by suitable packing rings as 34, 34. An air inlet as 38 is provided in the piston 16 opposite the passageway 32.

An alternate head as 37 may be provided for the extended end of the shaft 26, for actuation of the piston 16, if desired, to more accurately respond to the flow changes of the fluids in the conduit.

When the device is placed in operation, the bolt 20 may be adjusted to the desired position to maintain the proper resistance against the flow in the line, which should maintain the piston fully extended during normal flow in the flow conduit. If drops in flow pressure are anticipated, then the piston should be adjusted so that it may increase the flow of air through the air line. A constant supply of air at a given pressure will be maintained through the regulator to the passageway through the piston 16. The supply pressure to the line 7 will be maintained preferably at about three pounds. The flow gauger with the orifice in full open position will maintain the pressure on the line 7 at the said three pounds. The pressure controller restricts the air flow from the line 3 through its bleed off orifice 35 and the rate of bleed will be directly proportionate to the pressure drop in line 7 as caused by the variations in the position of the piston 16 in the barrel 11. The only resistance to the flow of air through the bleed off orifice 35 and the orifice 5 will be the atmospheric pressure. As the pressure drops in the line 7 by a closing of the orifice through the piston 16, the pressure on the controller through the line 39 connecting the controller 4 with the line 7, will also drop, permitting the controller to increase the flow of air from the line 3 through the bleed off orifice 35, actuating the motor of the motor valve 1. Any variations in the flow of the fluid in the flow line 9 will vary the flow of air through the piston 16, such as an increase in the flow line will bear against the head 28 moving the piston 16 rearwardly against the spring 18 and reducing the volume of flow of air through the orifice 32 by virtue of its movement out of alignment with the line 7, and because of the shape of the orifice, the movement of the piston 16 need be slight to effect a quick change in the pressure to the line 7. The springs 31, urging the keys 29 against the inside wall of the chamber 12 will maintain the piston in alignment and will limit the friction contact of the piston 16 with the chamber 12 to the surface of the keys 29. The movement of the piston 16 will be preferably very slight. For instance, a movement of less than one inch will completely close off the supply of air through the line 7. When the pressure of the air is reduced in the line 7, as above described, the bleed off through the controller 4 is increased and the diaphragm motor 2 actuated to adjust the flow through the valve 1. As soon as the flow through the valve 1 is corrected, the pressure against the head 28 will be corrected and the flow of air through the line 7 will be restored to the desired three pounds and the flow through the controller again balanced.

The head 28 is one of several possible designs that may be employed. It is contemplated that the shape of the head 28 may be varied, such as is shown in FIGURE 5, to secure the most efficient operation of the device in regulating the flow of various types of fluid, such as heavy petroleum or light gases.

While the foregoing is considered a preferred form of the invention, it is by way of illustration only, the broad principle of the invention being defined by the appended claims.

What I claim is:

1. In a flow responsive modulating means for use in a flow conduit having a motor valve therein and fluid pressure means for controlling said motor valve, comprising a flow conduit, a barrel mounted in said conduit having a yieldable piston slidable in said barrel and a control head integral with said piston and inlet and outlet ports in said barrel, an orifice in said piston and an air line communicating with said inlet and outlet ports in said barrel conducting a flow of air under a predetermined pressure through said piston, and in operative connection with the fluid pressure control means of a motor valve, said piston being movable by variations in the flow in said conduit against said head to vary the flow of air through said orifice and means for selectively determining the degree of yieldable pressure against said piston.

2. In a flow responsive modulating means for use in a flow conduit having a motor valve therein and fluid pressure means for controlling said motor valve, comprising a flow conduit, a barrel mounted in said conduit having a yieldable piston slidably mounted therein and a control head integral with said piston and inlet and outlet ports in said barrel, an orifice in said piston and an air line communicating with said inlet and outlet ports in said barrel conducting a flow of air under a predetermined pressure through said piston, said piston being movable by variations in the flow in said conduit against said head to vary the flow of air through said orifice and means for selectively determining the degree of yieldable pressure against said piston, said piston having means for yieldably aligning same within the barrel.

3. In a means for modulating the control regulator of an air controlled motor valve in a fluid conduit comprising: a fluid conduit, an air conduit having a constant flow of air of low pressure, a barrel mounted downstream of the flow in the fluid conduit, a piston mounted in said barrel, inlet and outlet connections for said air conduit to provide a flow of air through said piston, yieldable variable means on one end of said piston for regulating the movement of the piston in one direction and a shaft on the other end of said piston extending out of said barrel and having a control head thereon in the path of flow of the fluid, an orifice through said piston in alignment with the inlet and outlet in said barrel.

4. In a flow gauger for use in modulating the controller of a motor valve in a fluid conduit which controller would otherwise maintain a constant predetermined pressure on the motor valve by supplying a restricted flow of air through the pressure system and the motor valve is actuated by variations in the air pressure so supplied, a barrel mounted in a fluid conduit having a flow which is being controlled, a piston in said barrel, an air conduit through said barrel having an inlet and outlet ports in diametrically opposed position in said barrel, a transverse port through said piston movable into and out of complete alignment with said inlet and outlet ports to vary the volume of flow of air through said air conduit, yieldable means in said barrel bearing against said piston constantly urging said piston into complete aligned position with relation to said air conduit ports, means on one end of said piston exposed to the force of the flow being controlled, and means adjacent the other end of said piston for adjusting the yieldable means for urging the piston into complete aligned position.

References Cited in the file of this patent

UNITED STATES PATENTS

| | | |
|---|---|---|
| 1,182,878 | Standley | May 9, 1916 |
| 1,290,122 | Donovan et al. | Jan. 7, 1919 |
| 1,619,416 | Graemiger | Mar. 1, 1927 |
| 1,725,374 | Rush | Aug. 20, 1929 |
| 1,925,957 | Elfers | Sept. 5, 1933 |
| 2,189,511 | Carter | Feb. 6, 1940 |
| 2,224,101 | Hegwein | Dec. 3, 1940 |
| 2,470,452 | Ackley | May 17, 1949 |
| 2,472,090 | Brewer | June 7, 1949 |
| 2,584,418 | Brannon | Feb. 5, 1952 |
| 2,630,132 | Hughes | Mar. 3, 1953 |

FOREIGN PATENTS

| | | |
|---|---|---|
| 332,451 | Germany | Jan. 31, 1921 |